US012698887B1

(12) United States Patent
Fang

(10) Patent No.: US 12,698,887 B1
(45) Date of Patent: Aug. 4, 2026

(54) HOUSING WITH LIGHT SOURCE AND SPACER FOR MOBILE DEVICE IMAGING

(71) Applicant: eBay Inc., San Jose, CA (US)

(72) Inventor: Fang Fang, Westchester, NY (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 19/240,675

(22) Filed: Jun. 17, 2025

(51) Int. Cl.
| | |
|---|---|
| *F21V 21/088* | (2006.01) |
| *F21V 1/08* | (2006.01) |
| *F21V 21/096* | (2006.01) |
| *G03B 15/03* | (2021.01) |
| *G06F 1/26* | (2006.01) |
| *F21W 131/304* | (2006.01) |
| *F21Y 105/18* | (2016.01) |
| *F21Y 115/10* | (2016.01) |

(52) U.S. Cl.
CPC .............. *F21V 21/088* (2013.01); *F21V 1/08* (2013.01); *F21V 21/096* (2013.01); *G03B 15/03* (2013.01); *G06F 1/266* (2013.01); *F21W 2131/304* (2013.01); *F21Y 2105/18* (2016.08); *F21Y 2115/10* (2016.08)

(58) Field of Classification Search
CPC ........ F21V 21/088; F21V 21/096; F21V 1/08; F21Y 2115/10; F21W 2131/304; G03B 15/03; G06F 1/26
See application file for complete search history.

(56) References Cited

U.S. PATENT DOCUMENTS

| | | | |
|---|---|---|---|
| 10,012,888 B1 | 7/2018 | Penaflor | |
| 10,444,464 B2 | 10/2019 | Lin et al. | |
| 10,778,022 B2 * | 9/2020 | Reinger | H02J 50/10 |
| 11,003,048 B1 * | 5/2021 | Rawlani | A61B 5/0077 |
| 11,997,395 B2 * | 5/2024 | Ng | H04N 23/71 |
| 2009/0135287 A1 * | 5/2009 | Yang | H04N 23/55 348/E5.029 |
| 2022/0137491 A1 | 5/2022 | Stankie et al. | |

FOREIGN PATENT DOCUMENTS

| | | | | |
|---|---|---|---|---|
| KR | 20110009084 U | * | 9/2011 | G03B 17/565 |
| KR | 20200001034 U | * | 5/2020 | F21V 9/40 |
| RU | 204460 | | 5/2021 | |
| WO | WO-2008032952 A1 | * | 3/2008 | H04N 23/56 |
| WO | WO-2016205950 A1 | * | 12/2016 | G03B 15/05 |
| WO | WO-2022130667 A1 | * | 6/2022 | A61B 10/00 |

OTHER PUBLICATIONS

Lee, Lawrence Tan Soon, "Comparison of the Perceived Image Quality of Intraoral Orthodontic Photographs Taken With DSLR Camera and Mobile Phone Camera a Double-Blinded Prospective Study", Journal of Orofacial and Health Sciences, Jul. 2024, 11 pgs.

* cited by examiner

*Primary Examiner* — Zheng Song
(74) *Attorney, Agent, or Firm* — Shook Hardy & Bacon L.L.P.

(57) ABSTRACT

A housing includes an attachment mechanism, a light source including at least one light distributed around a first surface, and a spacer extending from the first surface by a first distance to maintain a fixed focal distance between a camera of a mobile device and an object to be imaged, the spacer forming at least a partially enclosed light shield that blocks external light.

20 Claims, 6 Drawing Sheets

100

106

104

102
Camera
Lens

108
Mobile Device

100

200
Attachment
Mechanism

202

108
Mobile Device

500

ATTACH HOUSING TO MOBILE DEVICE <u>502</u>

POWER ON LIGHT SOURCE <u>504</u>

CAPTURE IMAGE WITH CAMERA <u>506</u>

RUN AUTHENTICATION USING CAPTURED IMAGE
<u>508</u>

HOUSING WITH LIGHT SOURCE AND SPACER FOR MOBILE DEVICE IMAGING

TECHNICAL FIELD

The present disclosure relates generally to mobile device imaging accessories to enable capturing evenly-illuminated high-resolution close-up images using a mobile device camera.

BACKGROUND

Mobile devices, such as tablets and mobile phones, include a camera system. However, these camera systems are insufficient for highly detailed imaging, especially when needed for examining minute details of objects.

BRIEF SUMMARY

In one aspect, a housing includes an attachment mechanism, a light source including at least one light distributed around a first surface, and a spacer extending from the first surface by a first distance to maintain a fixed focal distance between a camera of a mobile device and an object to be imaged, the spacer forming at least a partially enclosed light shield that blocks external light.

In one aspect, a method includes attaching a housing to a mobile device, the housing including an attachment mechanism, a light source including at least one light distributed around a first surface, and a spacer extending from the first surface by a first distance to maintain a fixed focal distance between a camera of the mobile device and an object to be imaged, the spacer forming at least a partially enclosed light shield that blocks external light; powering on the light source; and capturing an image. In one aspect, the fixed focal distance may be determined using a range finding technology without mechanical constraint, e.g., LIDAR.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
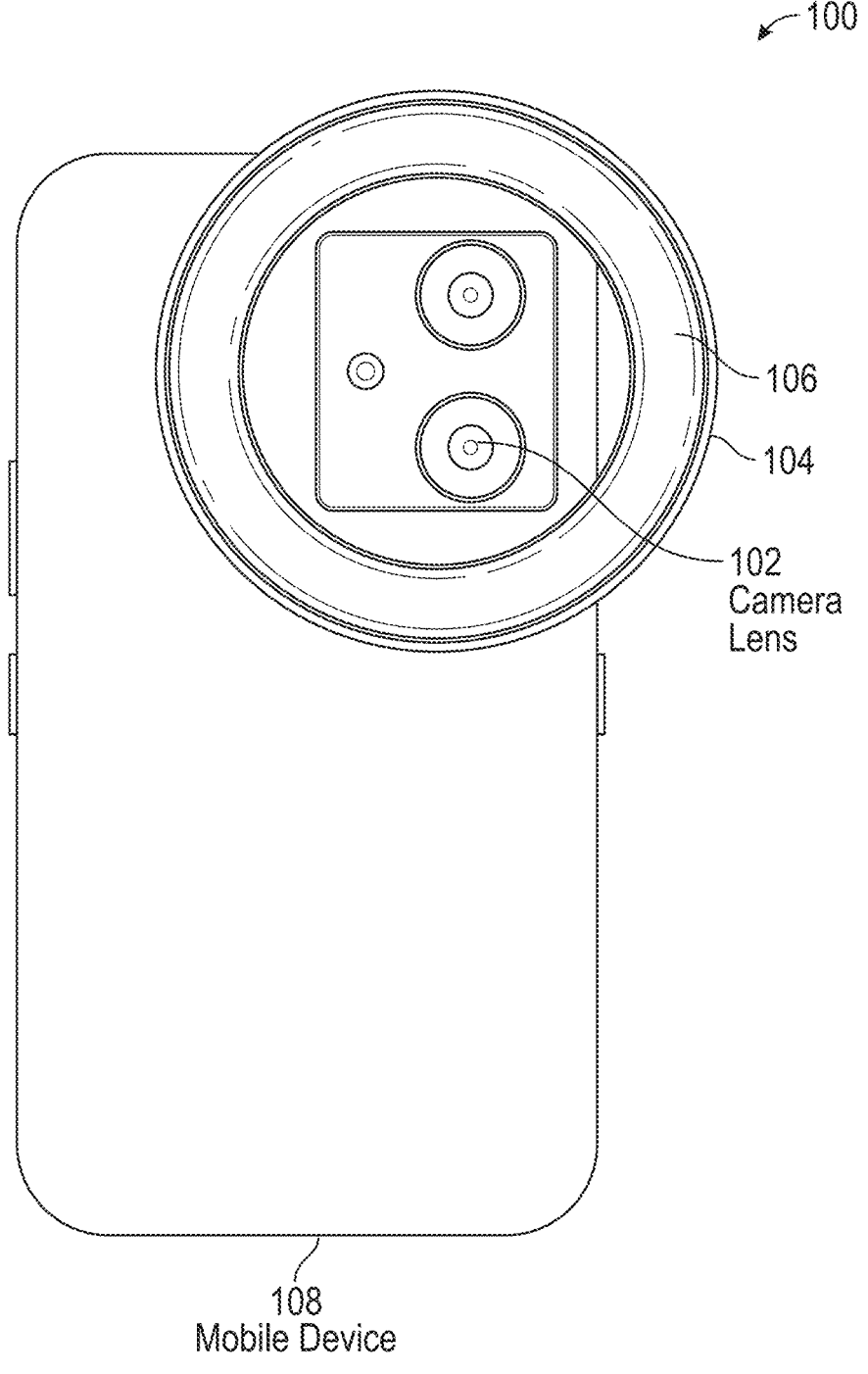
FIG. 1 is a diagram illustrating a back view of a housing in accordance with some examples.

Various examples of the present disclosure will be described in detail with reference to the drawings, wherein like reference numerals represent like parts and assemblies throughout the several views. Reference to various examples does not limit the scope of the present disclosure, which is limited only by the scope of the claims attached hereto.

Additionally, any examples set forth in this specification are not intended to be limiting and merely set forth some of the many possible examples for the present disclosure.

In one aspect, a housing includes an attachment mechanism, a light source that includes at least one light distributed around a first surface, and a spacer extending from the first surface by a first distance to maintain a fixed focal distance between a camera of a mobile device and an object to be imaged. The spacer forms at least a partially enclosed light shield that blocks external light.

By combining a light source, such as a light emitting diode (LED) light ring, with a spacer that maintains a fixed distance from the camera, the housing, when attached to the mobile device, enables users to capture high-resolution close-up images with the mobile device's (e.g., mobile phone, tablet) native camera. The light source provides even illumination while the spacer creates a controlled environment by blocking external light, ensuring consistent image quality across different lighting conditions.

Figure 2:
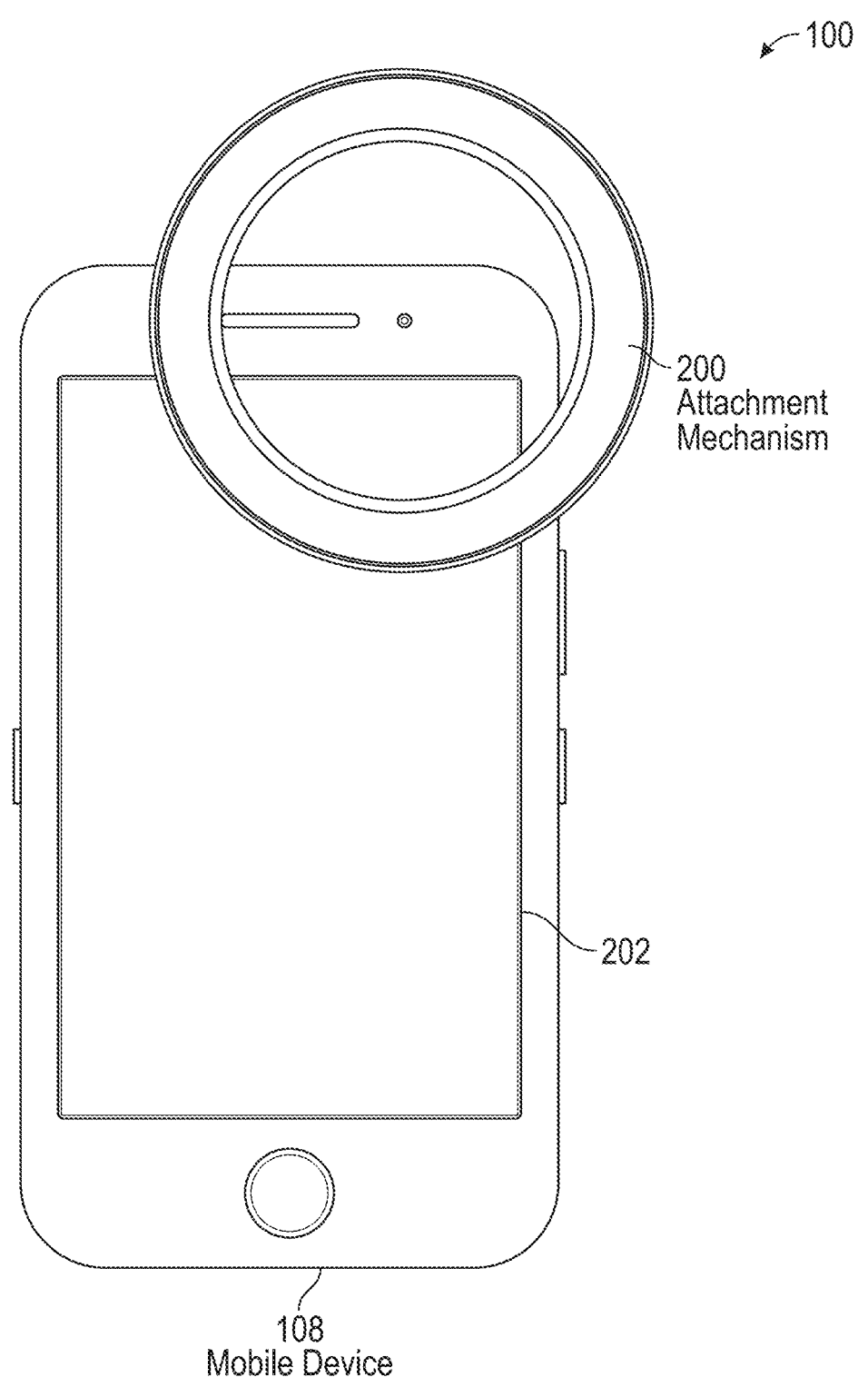
FIG. 2 is a diagram illustrating a front view of the housing in accordance with some examples.

FIG. 1 is a diagram illustrating a back view of a housing 100 in accordance with one example. The housing 100 comprises a spacer 104 coupled to a light source 106, which is in turn coupled to an attachment mechanism 200 (FIG. 2). The attachment mechanism 200 is coupled to a mobile device 108. The mobile device 108 may include one or more lenses on one more sides of the device 108, e.g., lens 102. The components of the housing 100 and the mobile device 108 are not shown at scale but for clarity. Dimensions of the spacer 104 may include, for example, a length x of approximately 1-3 inches, e.g., 1.88 inches and a radius of approximately 2-4 inches, e.g., 2.75 inches. A radius of the camera lens 102 of the mobile device 108 can be approximately 0.06 to 0.07 inches in one example. Note that while a single camera lens 102 is illustrated, the mobile device 108 may include multiple lenses including, for example, ultra-wide, telephoto and/or macro lenses. In an example, the dimensions of the mobile device 108 are a height of about 6 inches, a width of about 3 inches, depth of about 0.5 inches. The light source 106 may have a radius matching the spacer 104 radius or be smaller than the radius of the spacer 104. In an example, the light source 106 has a radius of approximately 2-4 inches, e.g., 2.75 inches.

FIG. 2 is a diagram illustrating a front view of the housing 100 in accordance with one example. In FIG. 2, the attachment mechanism 200 is removably coupled to the mobile device 108, partially covering a screen 202 of the mobile device 108. In one example, the attachment mechanism 200 includes a cutout having a width approximately the same as the mobile device 108, thereby enabling the attachment mechanism 200 to be slid on and off the mobile device 108 by inserting the mobile device 108 into the cutout of the attachment mechanism 200. In another example, the attachment mechanism 200 comprises one or more magnets instead of a cutout. In another example, the attachment mechanism 200 comprises a clip-on mechanism. In another example, multiple attachment mechanisms 200 can be used together. Note that in an example, if the clip-on and/or magnet is used, the attachment mechanism 200 may not partially obscure the screen 202.

Figure 3:
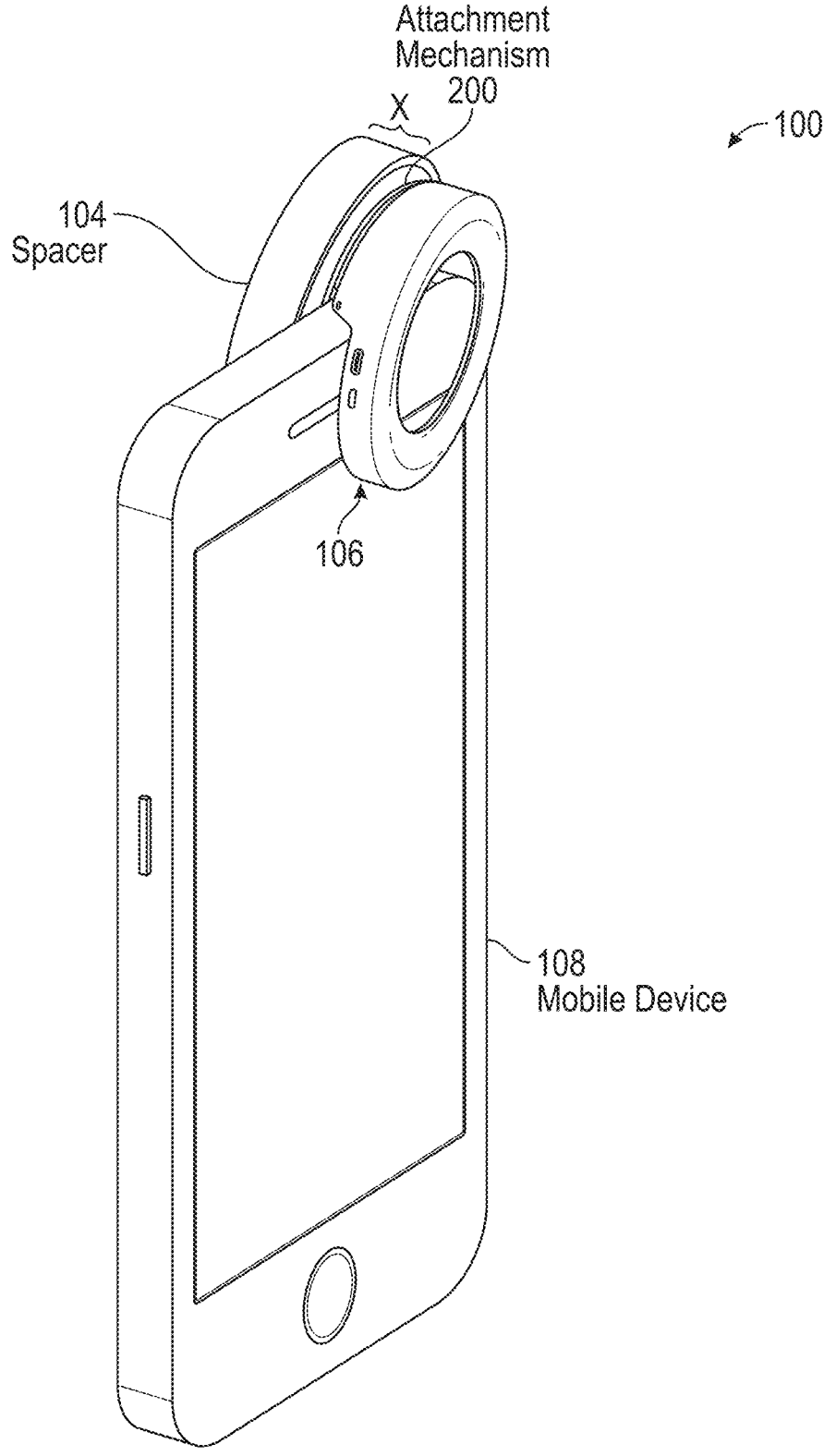
FIG. 3 is a diagram illustrating a perspective view of the housing in accordance with some examples.

FIG. 3 is a diagram illustrating a perspective view of the housing 100 in accordance with one example. As illustrated, the attachment mechanism 200 is removably attached to the mobile device 108. The light source 106 is coupled to the attachment mechanism 200 and the spacer 104. In an example, the length x of the spacer 104 is fixed. In another example, the length x of the spacer 104 is adjustable. For example, the spacer 104 may be telescoping.

Figure 4:
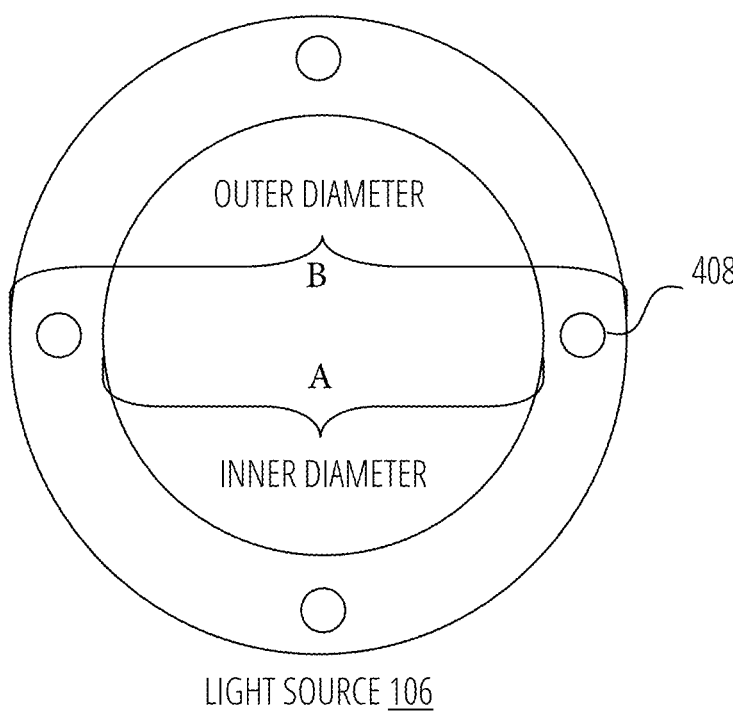
FIG. 4 is a block diagram illustrating a front view of a light source of the housing in accordance with some examples.

FIG. 4 is a block diagram illustrating a front view of a light source 106 of the housing 100 in accordance with one example. In an example, the light source 106 comprises a plurality (e.g., four) LED lights 408 distributed at 90 degrees from each other around a first surface of the light source 106. In another example, the plurality of LED light 408 may be lesser or higher in number (e.g., 60 or 240 LED lights 408) evenly distributed around the first surface of the light source 106. In another example, the light source 106 may have a single bulb shaped to match the circular first surface.

The light source 106 may further comprise a rechargeable battery and/or a cable for power. In addition, the light source 106 can be recharged wirelessly via inductive charging from a charger and/or from the mobile device 108. The light source 106 may have adjustable temperatures ranging 2700 K to 6500 K and multiple brightness modes. Note that in one example, not all LED lights 408 are activated simultaneously. For example, a first set of 120 LED lights 408 may have a color temperature of 3500 K while a second set of 120 LED lights 408 may have a color temperature of 6500K. The two sets of LED lights 408 are evenly distributed around the circular first surface of the light source 106.

In one example, the light source 106 has an inner diameter A of approximately 2.2 inches and an outer diameter B of approximately 3.5 inches. The light source 106, including the attachment mechanism 200 may have a thickness of approximately 1.2 inches.

Figure 5:
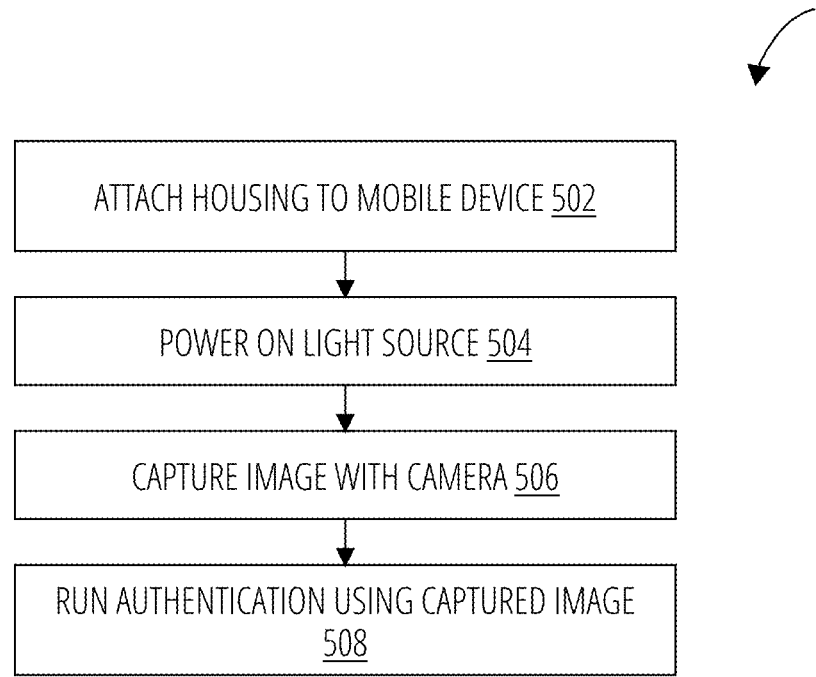
FIG. 5 is a flowchart illustrating a method of operating the housing in accordance with some examples.

FIG. 5 is a flowchart illustrating a routine 500 of operating the housing 100 in accordance with one example. At block 502, the housing 100 is attached to the mobile device 108. Attachment can be done via clip-on, magnet and/or cutout, etc. Note that the mechanisms are not mutually exclusive and multiple attachment mechanisms 200 can be used together. At block 504, the light source 106 is powered on, either from an internal rechargeable battery, inductive power and/or cable. Note that the order of block 502 and block 504 may be reversed. At block 506, the spacer 104 is placed up against an object to be imaged to maintain a fixed distance between the camera lens 102 and the object and consistent lighting and an image of the object is captured. Optionally, at block 508, a trained artificial intelligence (e.g., machine learning model) may be run on the captured image to perform authentication of the object. Alternatively, or in addition, product fingerprinting can be performed on object using the captured image.

In another example, the routine 500 and the housing 100 can be used to generate training data for the artificial intelligence by capturing images of authentic products and labelling the captured images. Additionally, the routine 500 and the housing 100 may used to generate training data for the artificial intelligence by capturing images of known inauthentic products and labelling the captured images as such. Due to the consistent lighting and focal distance in the captured images, whether for training or authentication, the artificial intelligence model (machine learning model) can be smaller and more accurate.

Figure 6:
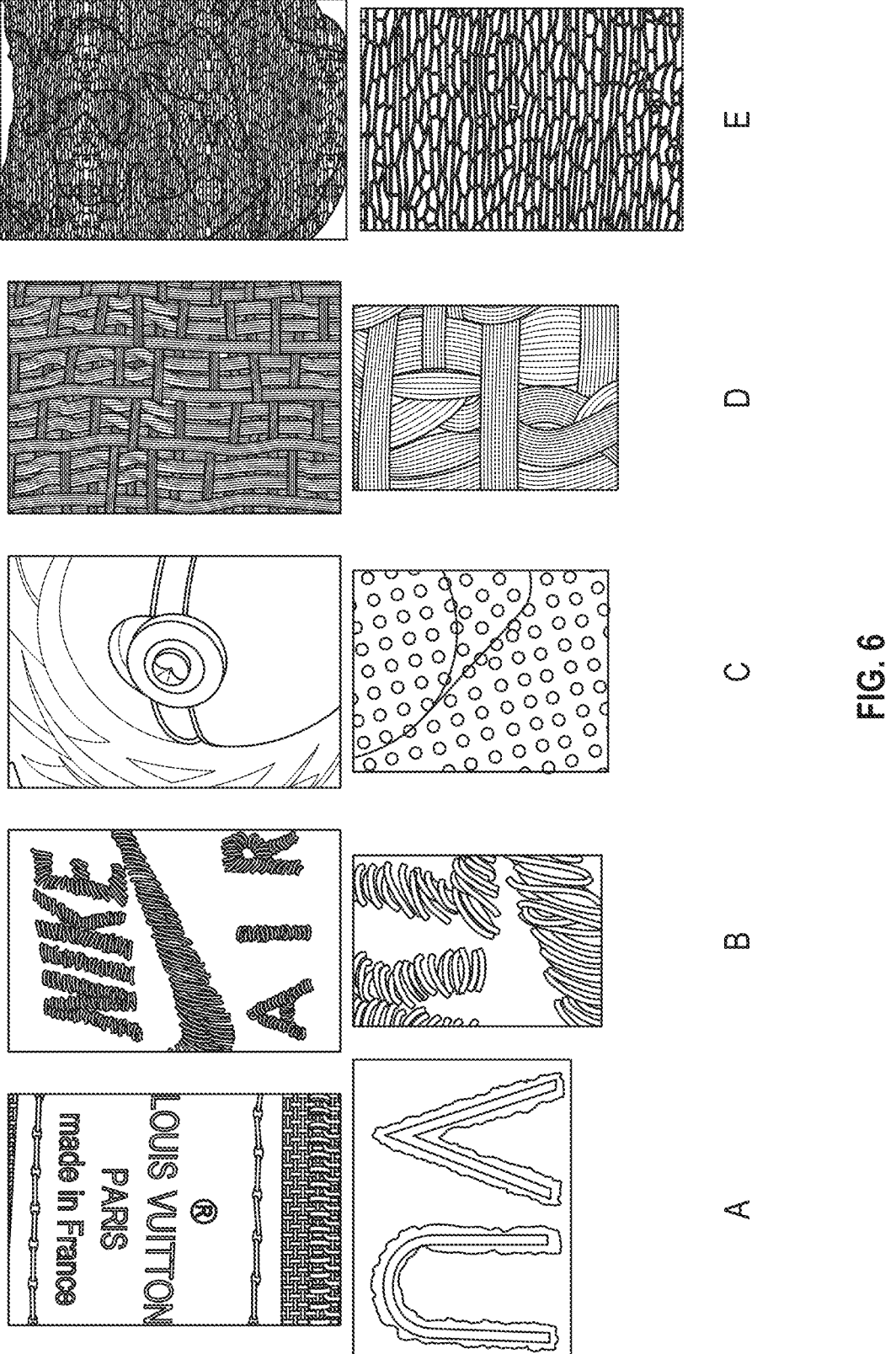
FIG. 6 illustrates images generated with the housing and method in accordance with some examples.

FIG. 6 illustrates two rows of images captured with the housing 100 and routine 500. The top row shows original captured 4K images and the bottom row shows manual zoom-in of specific regions to demonstrate the level of detail comparable to microscopic devices. From left to right, the first column A shows a handbag, the second column B shows a sneaker, the third column C shows a trading card, the fourth column D shows couch fabric and the fifth column E shows an onion skin.

Described implementations of the subject matter can include one or more features, alone or in combination, as illustrated below by way of example.

Example 1. A housing, comprising: an attachment mechanism; a light source comprising at least one light distributed around a first surface; and a spacer extending from the first surface by a first distance to maintain a fixed focal distance between a camera of a mobile device and an object to be imaged, the spacer forming at least a partially enclosed light shield that blocks external light.

Example 2. The housing of example 1, wherein an interior surface of the spacer has a non-reflective material.

Example 3. The housing of any of the preceding examples, wherein the first distance of the spacer is adjustable to accommodate different focal distances.

Example 4. The housing of any of the preceding examples, wherein the attachment mechanism comprises a magnetic attachment element.

Example 5. The housing of any of the preceding examples, wherein the attachment mechanism comprises a clip-on mechanism.

Example 6. The housing of any of the preceding examples, wherein the attachment mechanism comprises a cutout to slide the housing onto the mobile device.

Example 7. The housing of any of the preceding examples, further comprising a wireless charging element coupled to the attachment mechanism.

Example 8. The housing of example 7, wherein the wireless charging element draws power from the mobile device to power the light source.

Example 9. The housing of any of the preceding examples, wherein the spacer includes a spacer ring.

Example 10. The housing of any of the preceding examples, wherein the light source comprises a plurality of discrete LED lights distributed evenly around the first surface to provide uniform illumination.

Example 11. A method, comprising: attaching a housing to a mobile device, the housing comprising: an attachment mechanism; a light source comprising at least one light distributed around a first surface; and a spacer extending from the first surface by a first distance to maintain a fixed focal distance between a camera of the mobile device and an object to be imaged, the spacer forming at least a partially enclosed light shield that blocks external light.

Example 12. The method of example 11, wherein an interior surface of the spacer has a non-reflective material.

Example 13. The method of any of the preceding examples, further comprising adjusting the first distance of the spacer to accommodate a different focal distance.

Example 14. The method of any of the preceding examples, wherein the attachment mechanism comprises a magnetic attachment element.

Example 15. The method of any of the preceding examples, wherein the attachment mechanism comprises a clip-on mechanism.

Example 16. The method of any of the preceding examples, wherein the attachment mechanism comprises a cutout to slide the housing onto the mobile device.

Example 17. The method of any of the preceding examples, further comprising wireless charging the light source via a wireless charging element coupled to the attachment mechanism.

Example 18. The method of example 17, wherein the wireless charging element draws power from the mobile device to power the light source.

Example 19. The method of any of the preceding examples, wherein the spacer includes a spacer ring.

Example 20. The method of any of the preceding examples, wherein the light source comprises a plurality of discrete LED lights distributed evenly around the first surface to provide uniform illumination.

In conclusion, the disclosure provides a housing that controls lighting, fixed focal distance and native camera capability to enable microscopic imaging without additional lenses or separate imaging devices. The housing 100 can capture images that can be used for product authentication, material analysis, item fingerprinting and scientific applications.

What is claimed is:

1. A housing, comprising:
an attachment mechanism directly attachable to a mobile device;
a light source comprising a plurality of lights evenly distributed in a circular pattern around a first surface of a substrate, the substrate coupled to the attachment mechanism and defining an opening configured to align with a camera of the mobile device without directly contacting a lens of the camera; and
a spacer extending from the first surface by a first distance to maintain a fixed focal distance between a camera of a mobile device and an object to be imaged, the spacer forming at least a partially enclosed light shield that blocks external light.

2. The housing of claim 1, wherein an interior surface of the spacer has a non-reflective material.

3. The housing of claim 1, wherein the first distance of the spacer is adjustable to accommodate different focal distances.

4. The housing of claim 1, wherein the attachment mechanism comprises a magnetic attachment element.

5. The housing of claim 1, wherein the attachment mechanism comprises a clip-on mechanism.

6. The housing of claim 1, wherein the attachment mechanism comprises a cutout to slide the housing onto the mobile device.

7. The housing of claim 1, further comprising a wireless charging element coupled to the attachment mechanism.

8. The housing of claim 7, wherein the wireless charging element draws power from the mobile device to power the light source.

9. The housing of claim 1, wherein the spacer includes a spacer ring.

10. The housing of claim 1, wherein the light source comprises a plurality of discrete LED lights distributed evenly around the first surface to provide uniform illumination.

11. A method, comprising:
directly attaching a housing to a mobile device, the housing comprising:
an attachment mechanism;
a light source comprising a plurality of lights evenly distributed in a circular pattern around a first surface of a substrate, the substrate coupled to the attachment mechanism and defining an opening configured to align with a camera of the mobile device without directly contacting a lens of the camera; and
a spacer extending from the first surface by a first distance to maintain a fixed focal distance between a camera of the mobile device and an object to be imaged, the spacer forming at least a partially enclosed light shield that blocks external light.

12. The method of claim 11, wherein an interior surface of the spacer has a non-reflective material.

13. The method of claim 11, further comprising adjusting the first distance of the spacer to accommodate a different focal distance.

14. The method of claim 11, wherein the attachment mechanism comprises a magnetic attachment element.

15. The method of claim 11, wherein the attachment mechanism comprises a clip-on mechanism.

16. The method of claim 11, wherein the attachment mechanism comprises a cutout to slide the housing onto the mobile device.

17. The method of claim 11, further comprising wireless charging the light source via a wireless charging element coupled to the attachment mechanism.

18. The method of claim 17, wherein the wireless charging element draws power from the mobile device to power the light source.

19. The method of claim 11, wherein the spacer includes a spacer ring.

20. The method of claim 11, wherein the light source comprises a plurality of discrete LED lights distributed evenly around the first surface to provide uniform illumination.

* * * * *